(12) United States Patent
Uemoto et al.

(10) Patent No.: US 7,351,493 B2
(45) Date of Patent: Apr. 1, 2008

(54) BATTERY PACK

(75) Inventors: Seiichi Uemoto, Izumi (JP); Kenji Kimura, Kishiwada (JP); Tatsuya Hashimoto, Naga-gun (JP); Takabumi Fujii, Suita (JP); Hironori Yukisada, Hirakata (JP); Masatomo Nagatani, Naga-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 450 days.

(21) Appl. No.: 10/511,485

(22) PCT Filed: Jun. 3, 2003

(86) PCT No.: PCT/JP03/07048

§ 371 (c)(1),
(2), (4) Date: Oct. 15, 2004

(87) PCT Pub. No.: WO03/105269

PCT Pub. Date: Dec. 18, 2003

(65) Prior Publication Data

US 2005/0170239 A1    Aug. 4, 2005

(30) Foreign Application Priority Data

Jun. 11, 2002    (JP)    .............................. 2002-169482

(51) Int. Cl.
*H01M 2/12*    (2006.01)
*H01M 10/50*    (2006.01)
*H01M 2/00*    (2006.01)

(52) U.S. Cl. ...................................... 429/120; 429/148
(58) Field of Classification Search ................ 429/120, 429/148
See application file for complete search history.

(56) References Cited

U.S. PATENT DOCUMENTS 1,036,063 A * 8/1912 Bedell et al. ................ 429/120
6,111,387 A * 8/2000 Kouzu et al. ................ 320/107

FOREIGN PATENT DOCUMENTS

| JP | 8-255637 | | 10/1996 |
|---|---|---|---|
| JP | 10-252467 | | 9/1998 |
| JP | 10255735 | A  * | 9/1998 |
| JP | 10-284136 | | 10/1998 |
| JP | 2000-59917 | | 2/2000 |
| JP | 2001-319697 | | 11/2001 |
| JP | 2002-151025 | | 5/2002 |

* cited by examiner

*Primary Examiner*—Gregg Cantelmo
(74) *Attorney, Agent, or Firm*—Jordan and Hamburg LLP

(57) ABSTRACT

In a battery pack (1) that accommodates a plurality of batteries (11) arranged in parallel in a case (2) that forms a cooling-air passage (3), the cooling-air passage (3) and a gas-discharge passage (4) for discharging gas leaking from the battery (11) when the battery (11) falls into abnormal state are formed and separated from each other in the case (2).

1 Claim, 7 Drawing Sheets

RELATED ART

BATTERY PACK

TECHNICAL FIELD

The present invention relates to a battery pack. More particularly, the present invention relates to a battery pack in which a plurality of batteries are arranged in parallel in a case and a cooling-air passage is provided in the case so as to cool the respective batteries.

BACKGROUND ART

In recent years, expectation for electric vehicles or hybrid electric vehicles has increased because of the global environmental problems. For rechargeable batteries as the power supply of those vehicles, both reduction in the size and weight and increase of the capacity and output are demanded. Thus, a battery pack in which a plurality of batteries formed by cells are connected in series is used as the power supply. Moreover, a battery pack in which, in order to cool respective batteries, the batteries are arranged in parallel in a case and a cooling air from the vehicle interior is introduced into the case is known from Japanese Patent Laid-Open Publication No. 2001-319697, for example.

Referring to FIG. 8, a plurality of batteries 21 are arranged in parallel in a case 22 with a pitch that allows an appropriate ventilation gap to be formed between the adjacent batteries 21. In the case 22, cooling-air passages 23 and 24 are formed on both sides of the array of the batteries 21, respectively, and a cooling-air inlet 25 and a cooling-air outlet 26 are provided at one end of the cooling-air passage 23 and at the other end of the cooling-air passage 24, respectively.

The case 22 mentioned above is accommodated and secured in a battery box (not shown) which has a fan provided at a position opposed to the cooling-air inlet 25. Cooling air W delivered by the fan enters the cooling-air passage 23 of the case 22 from the cooling-air inlet 25, flows through the ventilation gap between the batteries 21 and the cooling-air passage 24, and is then discharged from the cooling-air outlet 26. The cooling air W cools the respective batteries 21 while flowing in the case.

However, in a case where the aforementioned battery pack is mounted in an electric vehicle or hybrid electric vehicle, air taken from the vehicle interior is introduced into the case 22 as the cooling air W, and the cooling air W of which the temperature has been increased by cooling the batteries 21 is discharged to the outside of the vehicle. Therefore, if the battery pack falls into abnormal state and gas is discharged into the case 22, the gas within the case 22 flows back into the vehicle interior when the fan stops.

Therefore, the present invention was made in view of the aforementioned problems of the conventional techniques, and aims to provide a battery pack that prevents gas discharged due to a trouble in a battery from flowing back through a supply passage of cooling air and prevents a trouble caused by the reverse flow of the gas.

DISCLOSURE OF THE INVENTION

A battery pack of the present invention includes a plurality of batteries arranged in parallel and accommodated in a case that forms a cooling-air passage, in which the cooling-air passage and a gas-discharge passage for discharging gas leaking from the battery when the battery falls into abnormal state are formed and separated from each other in the case. According to this structure, the gas leaking from the battery due to the battery abnormality will be discharged to the outside via the gas-discharge passage separated from the cooling-air passage. Thus, the leaking gas is prevented from flowing back through a supply passage of the cooling air and therefore a trouble caused by such reverse flow of the gas is prevented surely.

Moreover, a plurality of battery units each of which includes a plurality of batteries that are arranged coaxially and are connected in series are arranged in parallel in the case, and the gas-discharge passage is formed in regions corresponding to both sides of the case along a direction in which the batteries are arranged in parallel and a region corresponding to the connection between the batteries in the case. In this case, the use of a plurality of battery units each including a plurality of batteries that are arranged coaxially and are connected in series contributes to realization of a compact battery pack including a number of batteries, and the gas leaking from the battery when the battery falls into abnormal state will be discharged through the gas-discharge passage surely.

In addition, in a case where through holes through which the batteries are inserted are formed to extend through both sidewalls of the case and passage sidewalls for separating the gas-discharge passage from the cooling-air passage, the batteries are arranged within the case in such a manner that gas-discharge portions provided at one ends of the batteries are positioned within the gas-discharge passage, only by inserting the batteries into the corresponding through holes formed to extend through both sidewalls of the case and the passage sidewalls. Thus, it is possible to accommodate and arrange the batteries within the case with excellent productivity.

When a connection plate having connection means for sequentially connecting the batteries or battery units that are adjacent in series is provided on the outer surface of each of both sidewalls of the case, it is possible to realize series connection of the batteries accommodated and arranged in the case by using the connection plate provided on the outer surface of each sidewall of the case with excellent workability.

Furthermore, in a case where the case is formed by a case body in which the cooling-air passage is formed in such a manner that one side face is opened and the other side face is closed and the gas-discharge passage is formed in such a manner that one side face is closed and the other side face is opened, and cover plates for respectively covering both side faces of the case body, the case body is manufactured with excellent productivity by using a shaping die that allows die-cutting from both sides, and the case is formed by assembling the case body and the cover plates. Therefore, it is possible to manufacture the case including the cooling-air passage and the gas-discharge passage therein at a low cost.

BEST MODE FOR CARRYING OUT THE INVENTION

Figure 1:
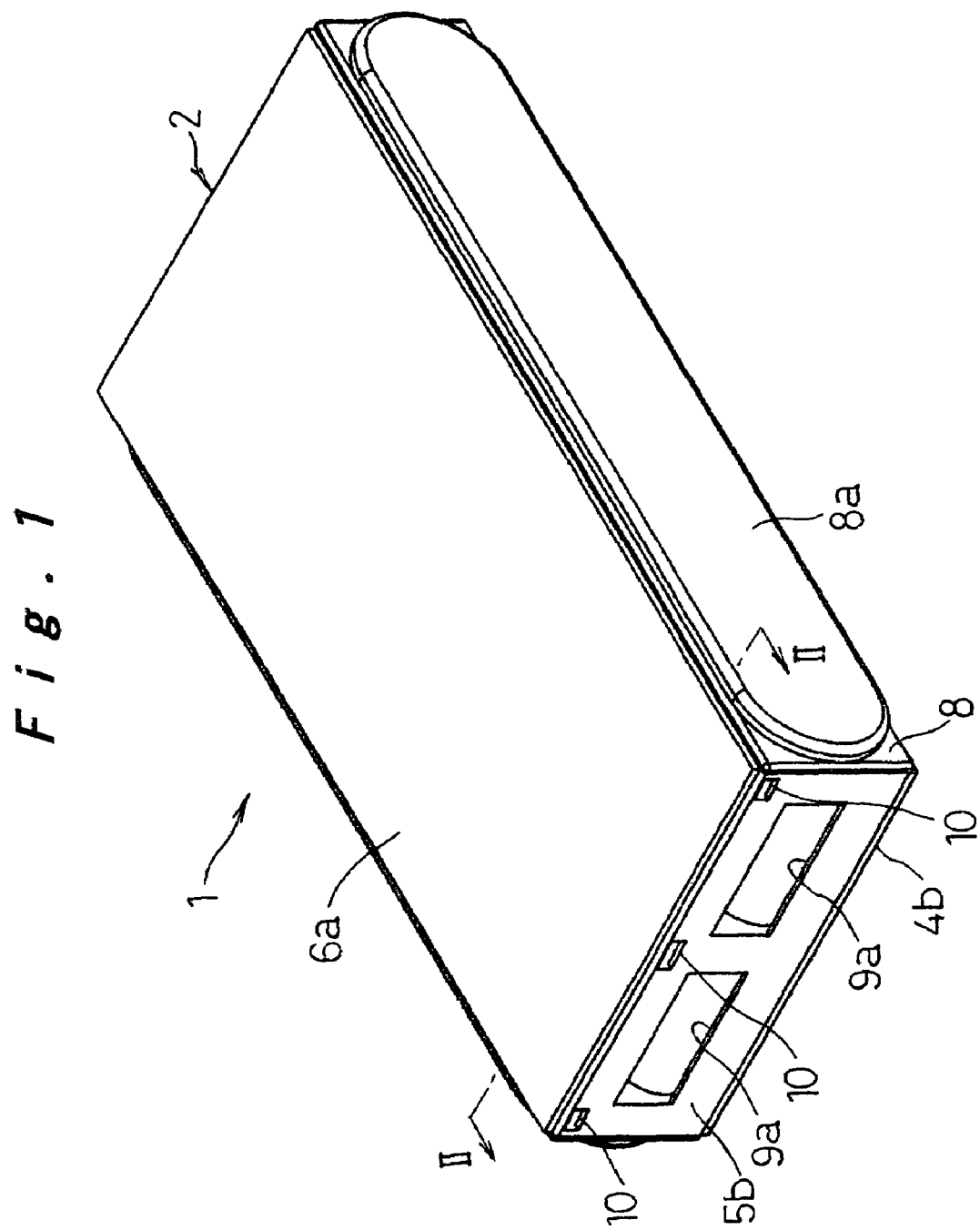
FIG. 1 is a perspective view of a battery pack according to an embodiment of the present invention.

A battery pack according to an embodiment of the present invention will be described hereinafter, with reference to FIGS. 1 through 7.

In FIGS. 1 through 4, a battery pack 1 accommodates a plurality of (ten in the shown example) battery units 12 in a flat and prismatic case 2, that are arranged in parallel in the case 2 with an appropriate gap between adjacent battery units 12 and are connected in series. Each battery unit 12 includes a plurality of (two in the shown example) batteries 11 that are coaxially arranged and are connected in series. In the case 2, a cooling-air passage 3 is formed to face the batteries 11 in each of the battery units 12 arranged in parallel except for portions around both ends of the batteries 11, while a gas-discharge passage 4 is formed on regions corresponding to both sides of the case 2 along the direction in which the battery units 12 are arranged in parallel and a region corresponding to the connection between the batteries 11 in each battery unit 12 in such a manner that the gas-discharge passage 4 faces both ends of the respective battery 11. In order to manufacture the case 2 with excellent productivity by using a shaping die that allows die-cutting from upper and lower sides, the case 2 is formed by: a case body 5 in which the cooling-air passage 3 is formed in such a manner that the upper side face is opened and the lower side face is closed and the gas-discharge passage 4 is formed in such a manner that the upper side face is closed and the lower side face is opened; and cover plates 6a and 6b for covering both side faces of the case body 5 so as to close the openings of the cooling-air passage 3 and the gas-discharge passage 4.

In sidewalls 5a of the case body 5 that extend along the direction in which the batteries 11 are arranged in parallel and passage sidewalls 4a for separating the gas-discharge passage 4 and the cooling-air passage 3 from each other, through holes 7 into which the batteries of the battery units 12 are inserted are provided at positions corresponding to the positions at which the battery units 12 are to be arranged. By inserting the battery units 12 into the through holes 7 from either sidewall 5a of the case body 5, the battery units 12 are accommodated and arranged in the case 2. Moreover, sealing means, for example, a rubber gasket, a rubber ring or an appropriate sealing agent such as a pitch, may be provided at a gap between the through hole 7 of the passage sidewall 4a and the battery unit 12 inserted thereinto, if necessary, thereby ensuring the sealing between the cooling-air passage 3 and the gas-discharge passage 4.

On the outer surface of each of both sidewalls 5a of the case body 5, connection plates 8 are provided each of which includes connection means (8b) for sequentially connecting adjacent battery units 12 in series. Moreover, the outer surface of the connection plate 8 is covered with a connection cover 8a. In both end walls 5b of the case body 5, a cooling-air inlet 9a and a cooling-air outlet 9b are formed in the middle portion in the vertical direction, of a region opposed to the cooling-air passage 3. In addition, a gas-discharge port 10 is formed at an upper end portion of a region of one end wall 5b of the case body 5, the region facing the gas-discharge passage 4.

Figure 2:
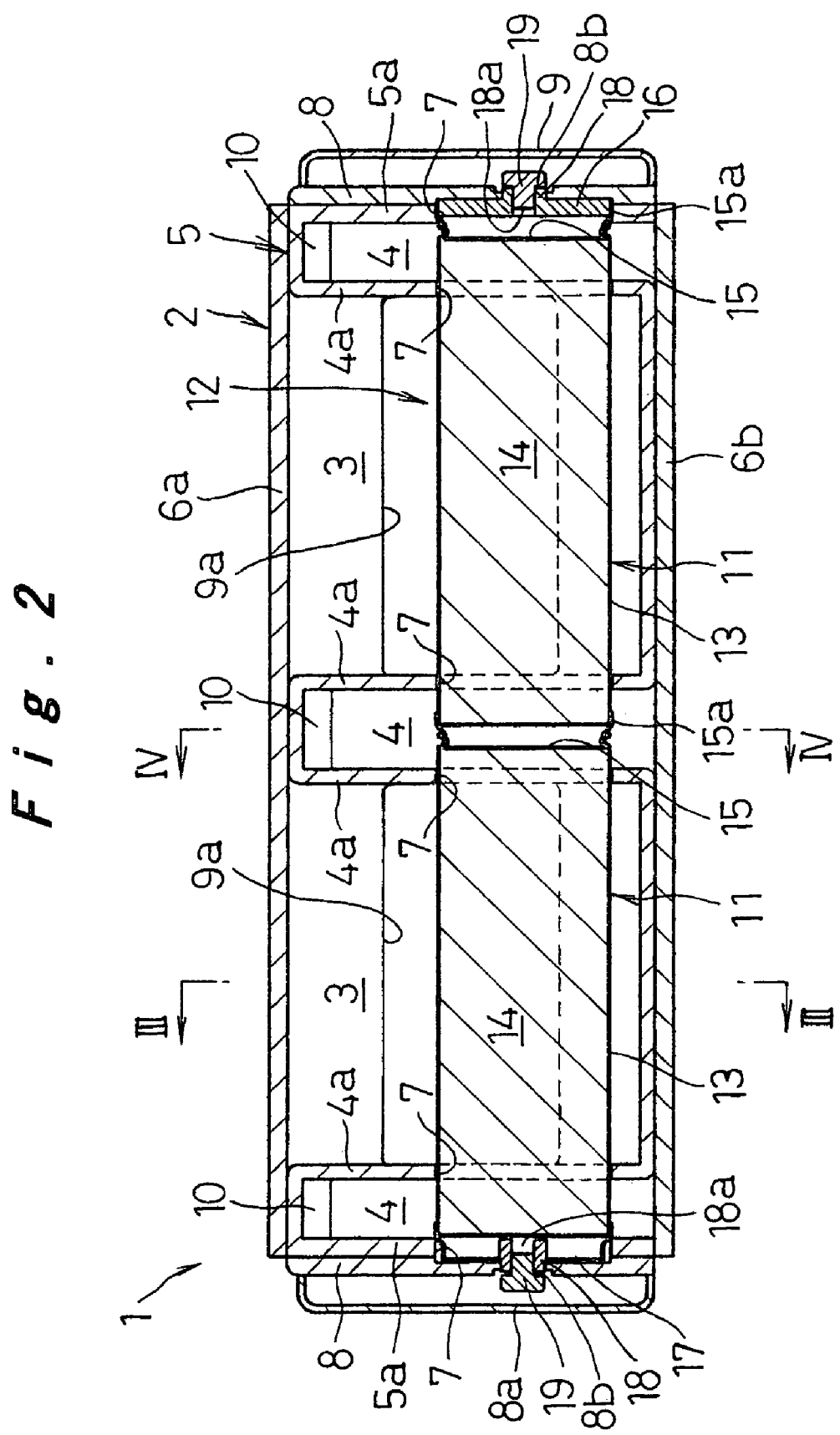
FIG. 2 is a cross-sectional view of the battery pack, cut along the line II-II in FIG. 1.
Figure 3:
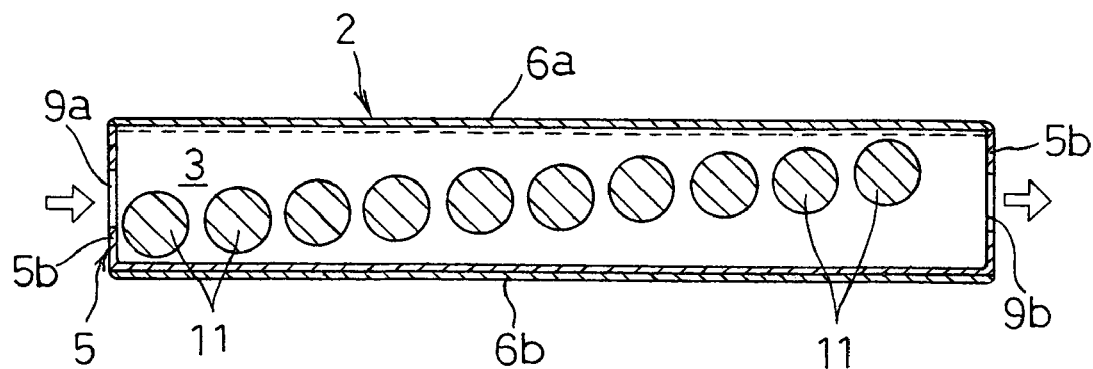
FIG. 3 is a cross-sectional view of the battery pack, cut along the line III-III in FIG. 2.
Figure 4:
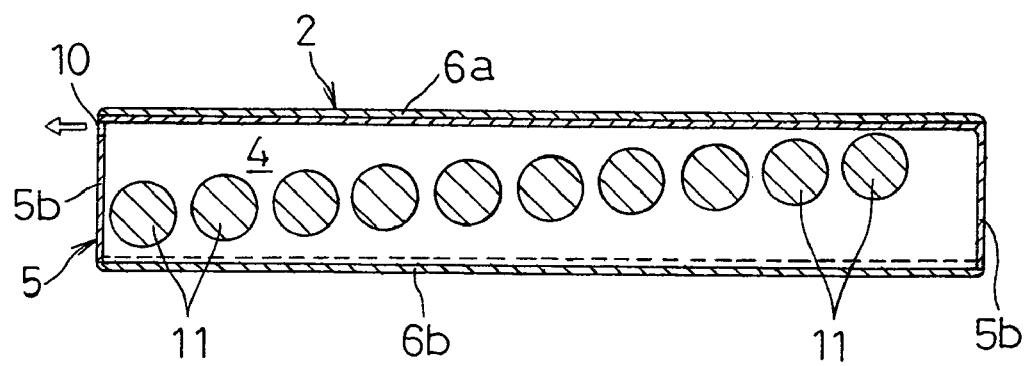
FIG. 4 is a cross-sectional view of the battery pack, cut along the line IV-IV in FIG. 2.
Figure 5:
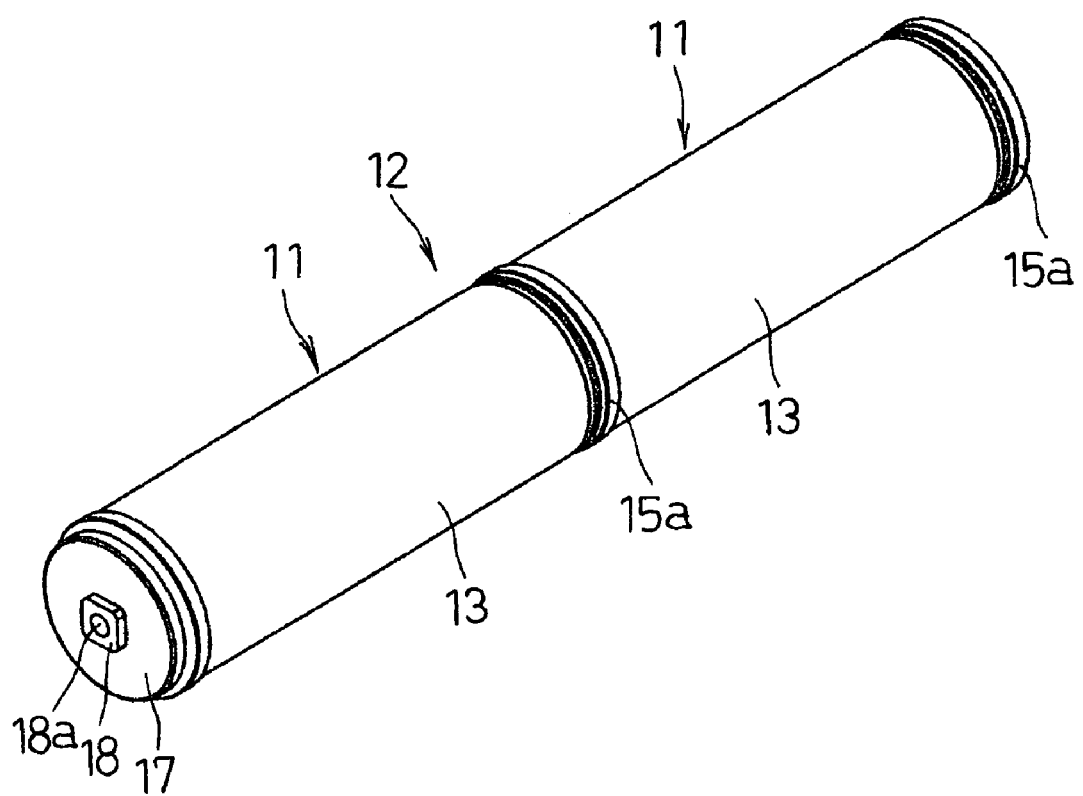
FIG. 5 is a perspective view of a battery unit according to the present embodiment.

As shown in FIGS. 2 and 5, the battery 11 accommodates an electrode plate assembly 14 together with battery electrolyte in its outer case 13 that is sealed with a cover 15 with an insulator interposed therebetween. The outer case 13 is formed by a deep-draw molded part that is in form of cylinder having a bottom. The molded part is made from nickel-plated steel sheet having electrolyte-resistance. The cover 15 is formed by a press-molded part in form of stepped bowl having a connecting cylindrical portion 15a into which the bottom of the outer case 13 is inserted and just fits. On the center of the cover 15, a port via which the electrolyte is injected and safety mechanism (both not shown) is provided.

The electrode plate assembly 14 is formed by a positive electrode plate and a negative electrode plate that are wound with a separator interposed therebetween. The center core of the positive electrode plate and that of the negative electrode plate are exposed on an upper end surface and a lower end surface of the electrode plate assembly 14 and are connected to the cover 15 and the bottom of the outer case 13, respectively, for example, by laser welding. The positive electrode plate is formed by applying a positive electrode material containing a positive electrode active material such as $LiCoO_2$, $LiMn_2O_4$ or $LiNiO_2$, and a binder onto both sides of the center core made of aluminum foil. The negative electrode plate is formed by applying a negative electrode material containing a negative electrode active material such as graphite, petroleum cokes, or carbon fiber, and a binder onto both sides of the center core made of copper foil.

The battery unit 12 is formed by a plurality of batteries 11, each having the aforementioned structure, that are connected in series. More specifically, the batteries 11 are connected to each other electrically and mechanically by fitting the bottom of the outer case 13 of one battery 11 into the connecting cylindrical portion 15a of the cover 15 of the other battery 11 and then welding that connecting cylindrical portion 15a to the outer periphery of the bottom of the outer case 13. Moreover, a connection plate 16 having a connection terminal 18 projecting at the center thereof is welded to the inner periphery of the connecting cylindrical portion 15a of the cover 15 of one battery 11, while a connection member 17 having a connection terminal 18 fixed at the center thereof is welded to the outer surface of the bottom of the other battery 11. The connection member 17 has a similar shape to that of the cover 15. At the center of the connection terminal 18, a screw hole 18a for connection is provided.

Figure 6:
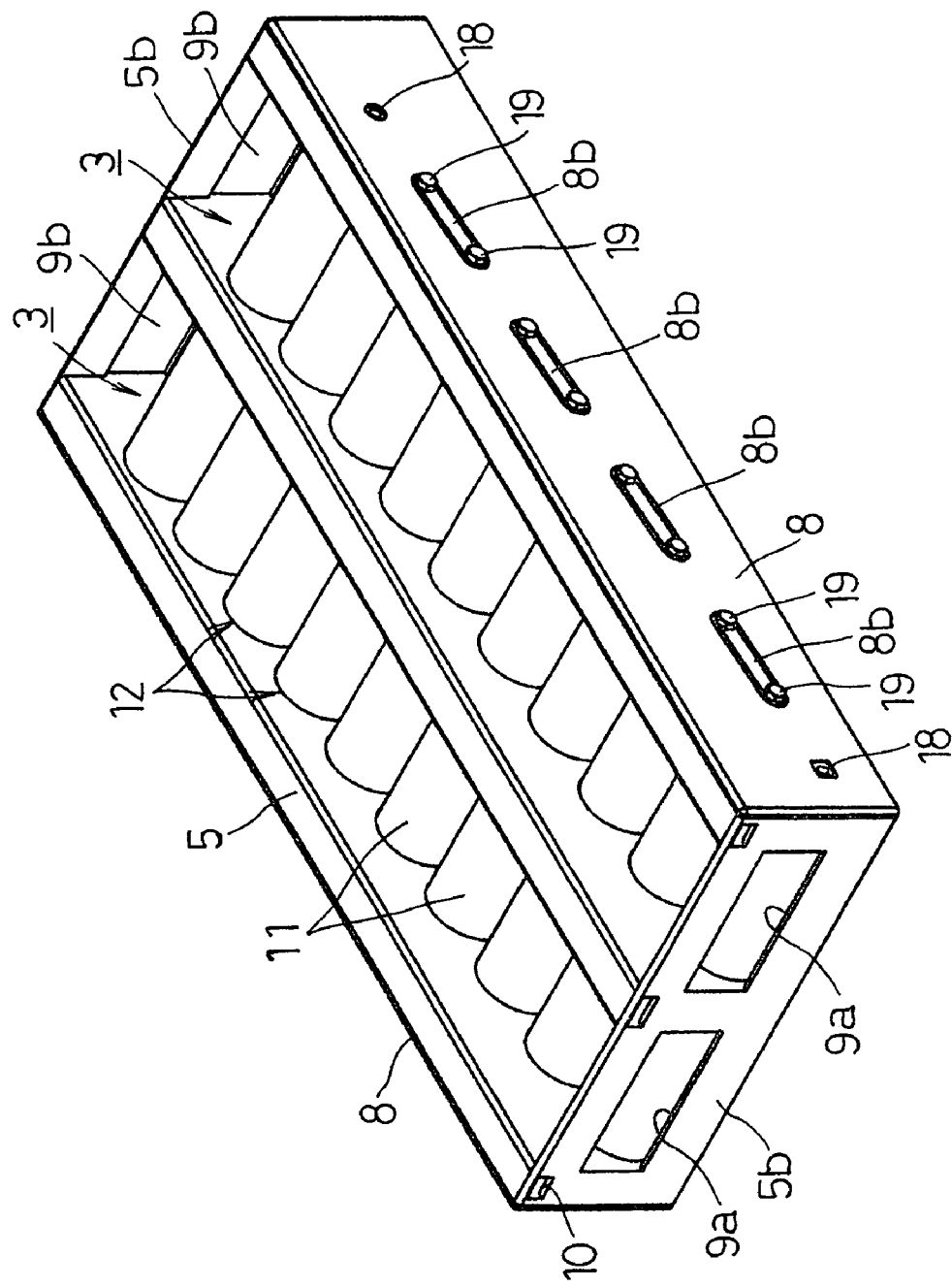
FIG. 6 is a perspective view of the battery pack according to the present embodiment, with a cover plate and a connection cover removed.

The battery units 12 mentioned above are inserted into the corresponding through holes 7 from one of the sidewalls 5a of the case body 5 in such a manner that the positive connection terminals 18 and the negative connection terminals 18 are alternately arranged. In this way, a predetermined number of battery units 12 are accommodated and arranged in the case 2. Then, as shown in FIGS. 2 and 6, the connection plates 8 are placed on the outer surfaces of both sidewalls 5a so as to bring the connection means 8b formed by a metal plate embedded in each connection plate 8 into contact with the positive connection terminal 18 and the negative connection terminal 18 of the adjacent battery units 12. By fastening the connection means 8b by means of screw bolts 19 together, the battery units 12 are connected in series. The outer surface of this connection plate 8 is covered with the connection cover 8a.

Figure 7:
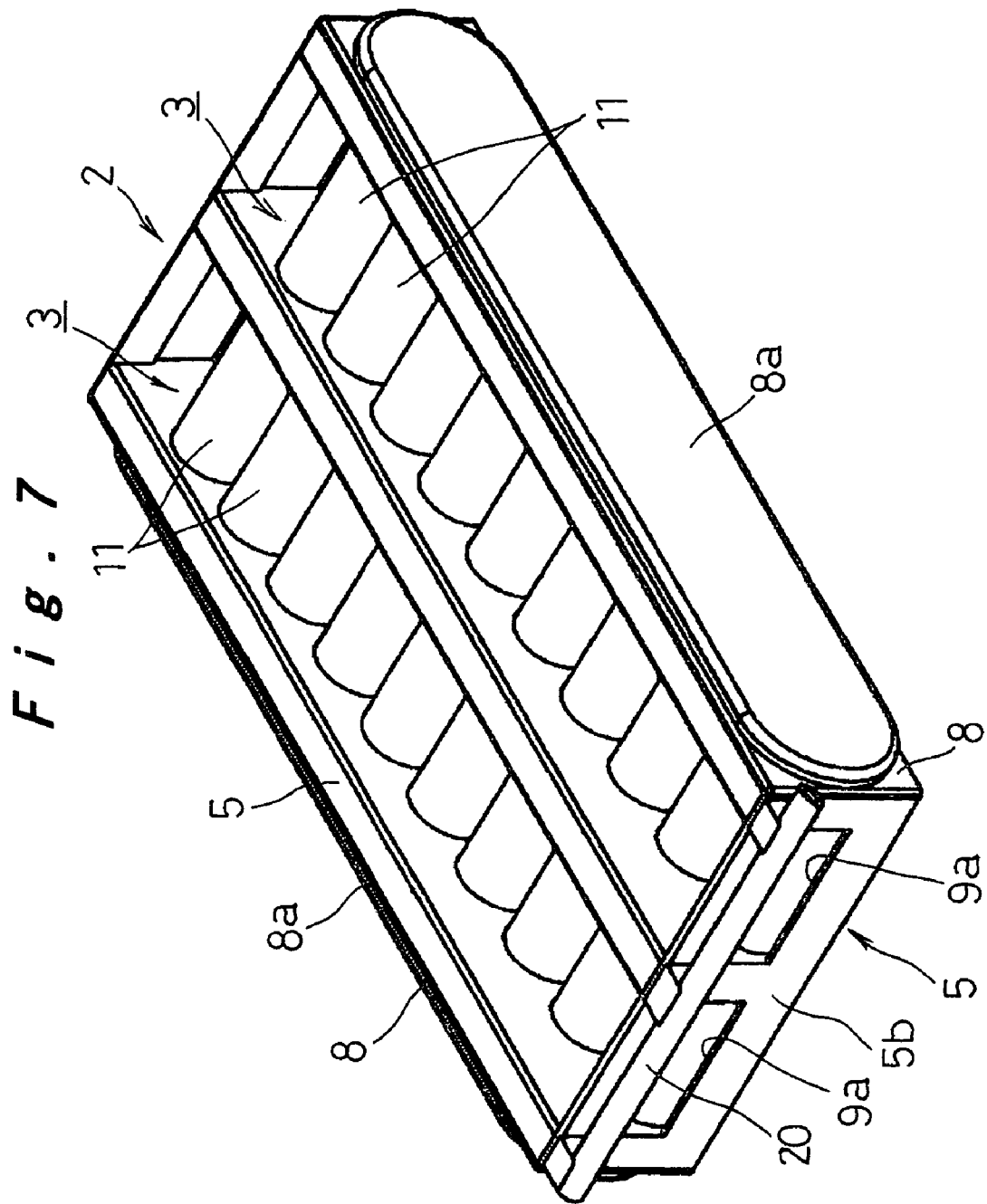
FIG. 7 is a perspective view of the battery pack according to the present embodiment, showing a connection state of a gas-discharge tube in the embodiment of the present invention.
Figure 8:
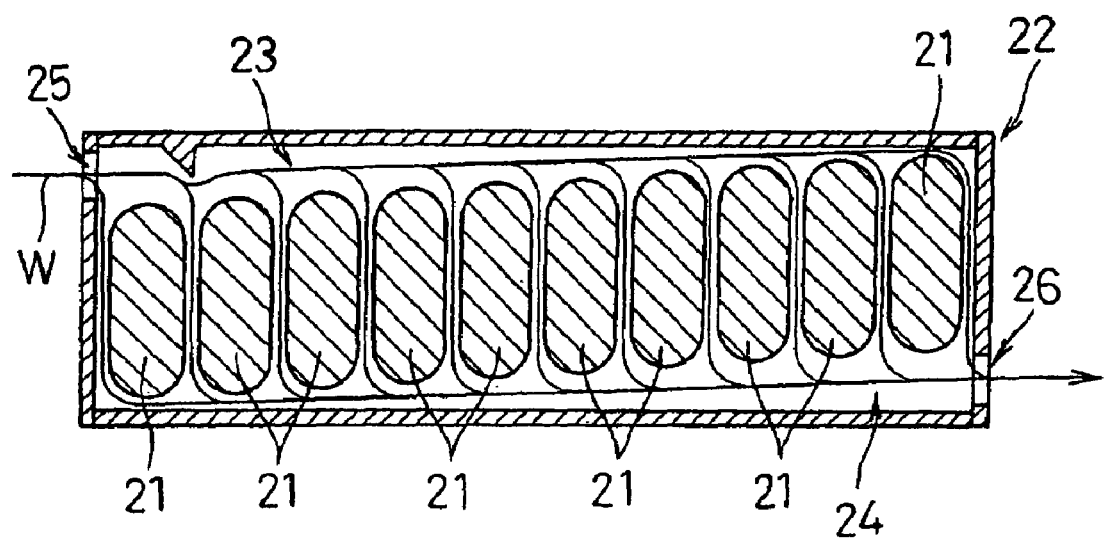
FIG. 8 is a cross-sectional view of a conventional battery pack.

Each gas-discharge port 10 formed in one end wall 5b of the case body 5 of the case 2, shown in FIG. 6, is connected to a gas-discharge tube 20, as shown in FIG. 7. Thus, gas is made to flow through the gas-discharge tube 20 to be discharged to the outside of the vehicle.

According to the above structure, air in the vehicle interior is sent as cooling air by means of a fan (not shown) provided in a ventilation passage (not shown) that communicates with the vehicle interior and the cooling air is introduced into the cooling-air passage 3 in the case 2 via the cooling-air inlet 9a formed in the end wall 5b of the case body 5. Thus, the batteries 11 of each battery unit 12 are cooled by that cooling air except for portions around both ends of the batteries 11 and therefore the temperature increase in the respective batteries 11 is prevented surely, resulting in ensuring output characteristics and battery life of the respective batteries 11. The cooling air after cooling the batteries 11 flows out of the cooling-air outlet 9b, so as to be discharged to the outside of the vehicle.

On the other hand, when the battery 11 falls into abnormal state and gas leaked from the safety mechanism provided in the cover 15 of that battery 11, the gas is discharged to the gas-discharge passage 4 that is formed in the case 2 to be separated from the cooling-air passage 3, and is then discharged to the outside of the vehicle through the gas-discharge tube 20. Therefore, it is possible to prevent the leaking gas from flowing into the vehicle interior through the passage for supplying the cooling air, thus preventing a trouble caused by such reverse gas flow.

Moreover, in the present embodiment, a plurality of battery units 12 each of which is formed by connecting a plurality of batteries 11 arranged coaxially in series are accommodated in the case 2 to be arranged in parallel. Therefore, the battery pack 1 including a number of batteries 11 is achieved with a compact structure. In addition, since the gas-discharge passage 4 is formed in regions corresponding to both sides of the case 2 and a region corresponding to the connection between the batteries 11, the gas that leaked because of a trouble in each battery 11 will be discharged surely through the gas-discharge passage 4.

Furthermore, the through hole 7 is formed to extend through both sidewalls 5a of the case body 5 of the case 2 and the passage sidewalls 4a for separating the gas-discharge passage 4 from the cooling-air passage 3. Therefore, only by inserting a plurality of battery units 12 into the corresponding through holes 7, respectively, the battery units 12 are accommodated and arranged in the case 2 so as to arrange a gas-discharge portion provided at one end of each battery 11 in the gas-discharge passage 4. Thus, it is possible to accommodate and arrange the battery units 12 in the case 2 with excellent productivity.

In addition, since the connection plates 8 are placed on the outer surfaces of both sidewalls 5a of the case body 5 so as to connect the batteries 11 or battery units 12 that are adjacent to each other in series sequentially, series connection of the battery units 12 accommodated and arranged in the case 2 is performed on the outer surfaces of both sidewalls of the case 2 with excellent workability.

Furthermore, the case 2 is formed by the case body 5, that is manufactured by using a shaping die that allows die-cutting from both sides with excellent productivity, and the cover plates 6a and 6b for covering both side faces of the base body 5. Therefore, it is possible to manufacture the case having the cooling-air passage 3 and the gas-discharge passage 4 at a low cost.

Although only an example in which the battery 11 is formed by a lithium-ion battery is described in the description of the above embodiment, the present invention is also applicable to a battery having a structure other than the above, such as a nickel metal hydride battery and the same advantageous effects will be achieved.

INDUSTRIAL APPLICABILITY

As described above, according to the present invention, a cooling-air passage and a gas-discharge passage for discharging gas leaking from a battery when the battery falls into abnormal state are formed to be separated from each other. Therefore, it is possible to discharge the gas leaking from the battery when the battery falls into abnormal state, to the outside of a vehicle through the gas-discharge passage. This structure is suitable for surely preventing the gas from flowing back through a supplying passage of the cooling air.

Moreover, a plurality of battery units each of which includes a plurality of batteries that are arranged coaxially and are connected in series are accommodated in a case to be arranged in parallel, and the gas-discharge passage is formed in regions corresponding to both sides of the case along a direction in which the batteries are arranged in parallel and a region corresponding to the connection between the batteries. This structure is suitable for realizing a compact battery pack even if a number of batteries are used.

The invention claimed is:

1. A battery pack, including a plurality of batteries arranged in parallel and accommodated in a case that forms a cooling-air passage, wherein the cooling-air passage and a gas-discharge passage are formed and separated from each other in the case, and the case is formed by: a case body in which the cooling-air passage is formed in such a manner that one side face is opened and the other side face is closed and the gas-discharge passage is formed in such a manner that one side face is closed and the other side face is opened; and cover plates for respectively covering both side faces of the case body.

* * * * *